Oct. 27, 1936.  F. M. WHYTE  2,059,074

SHEARS

Filed Nov. 22, 1935

INVENTOR
Frederick M. Whyte
BY
ATTORNEYS

Patented Oct. 27, 1936

2,059,074

UNITED STATES PATENT OFFICE 2,059,074

SHEARS

Frederick M. Whyte, Tarrytown, N. Y.

Application November 22, 1935, Serial No. 50,999

10 Claims. (Cl. 30—13)

This invention relates to improved stop means to limit the closing of shears.

In the operation of shears, and more particularly in the operation of large, two-handed shears, such as hedge shears for example, the shock of closing impact is transmitted to the hands and arms of the operator and is painful and tiring. The impact is also very noisy. An important object of the present invention is to provide improved stop means designed to materially reduce this shock and noise.

Other objects of the invention will appear hereinafter.

This application is a continuation in part of my co-pending patent application Serial No. 19,189, filed May 1, 1935.

Figure 1:
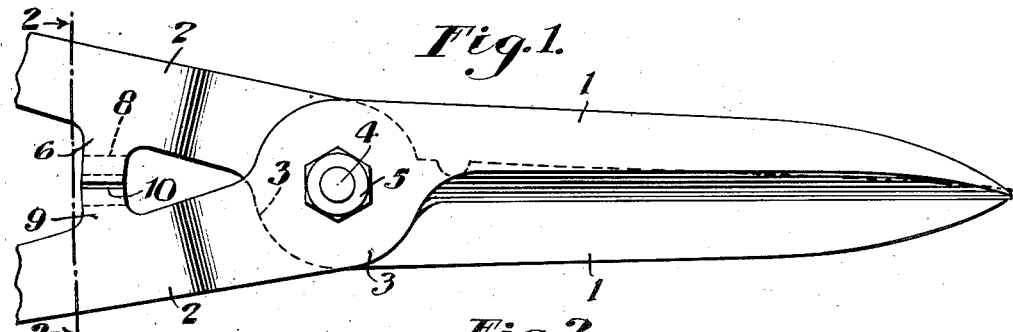
Figure 2:
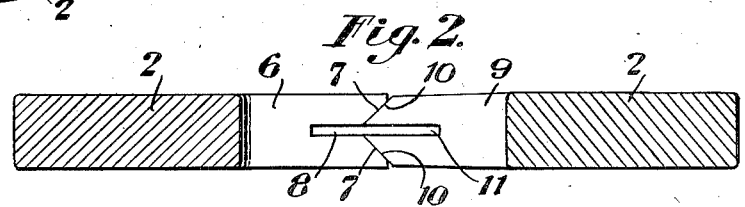
Figure 3:
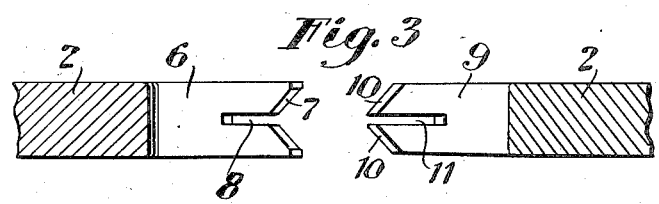
Figure 4:
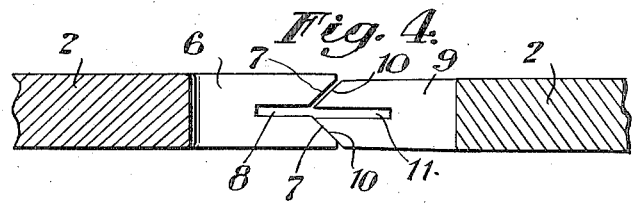
Figure 5:
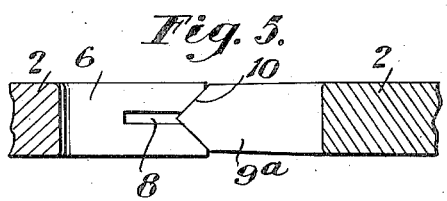
Figure 6:
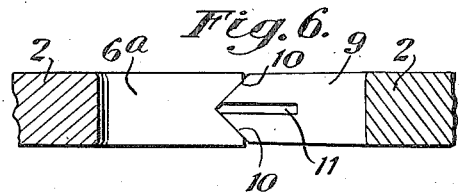
Figure 7:
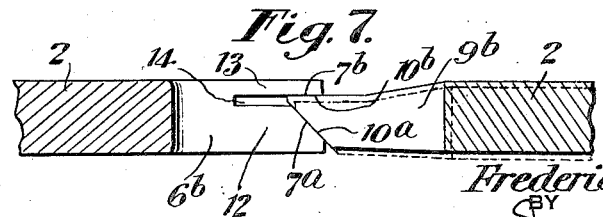

In the drawing, Fig. 1 is a partial plan view of shears embodying the invention;

Fig. 2 an enlarged section on the line 2—2 of Fig. 1;

Fig. 3 a view similar to Fig. 2 showing the stop abutments separated by opening of the shears;

Fig. 4 a view similar to Fig. 2 showing a slightly offset relation of the stop abutments; and Figs. 5, 6, and 7 views similar to Fig. 2, showing modifications of the stop abutments.

The improved stop means is illustrated as embodied in hedge shears of a standard form adapted to be operated by both hands. Said means may, however, be embodied satisfactorily in other forms of shears. The shears comprise two members each forming a blade 1 and a handle shank 2. Said members have medial hub portions 3 which are overlapped and pivotally connected by a bolt 4 and nut 5, or other suitable pivot device. The handle shanks 2 may be made rather long and provided with suitable grips, not shown, for operation of the shears by both hands. The stop means to limit the closing of the shears are spaced rearward from the pivot and made entirely integral with the shanks 2.

In the form of the invention illustrated in Figs. 1, 2, and 3, one of the handle shanks 2 has an integral stop lug 6 projecting from the inner longitudinal edge of the shank laterally toward the other shank. The edge of the outer extremity of said lug is straight and it is formed with a substantially V-shaped notch or channel extending longitudinally along an approximately radial line from the pivot axis of the shears. The walls of said channel form converging abutment surfaces 7. Said surfaces are flat and smooth and each is inclined with reference to the line or plane of movement of the lug as the shears are opened and closed. The lug 6 is also formed with a cleft 8 extending from the bottom of the V-shaped notch or channel inward, preferably along a material length of the lug. This enables the portions of the lug at opposite sides of the cleft to yield outward slightly under impact upon the abutment surfaces 7. Preferably said yieldable portions are rather thick and substantial so that their yield will be slight and they will be very strong and resilient.

The other of the shanks 2 has a strong integral stop lug 9 at its inner edge and projecting toward the lug 6. The edge of the extremity of the lug 9 is straight and extends approximately along a radial line from the pivot axis of the shears and it is oppositely beveled, or abruptly tapered, to form two outwardly converging abutment surfaces 10. Said surfaces are flat and smooth and their inclination corresponds to that of the abutment surfaces 7 on the lug 6. This lug is also formed with a cleft 11 extending from the apex of its taper inward, preferably along a material length of the lug. The cleft enables the portions of the lug at opposite sides thereof to yield inward slightly under impact upon the abutment surfaces 10. Preferably said yieldable portions also are rather thick and substantial so that their yield will be slight and they will be very strong and resilient. Each of the lugs 6 and 9 and the entire blade and handle member which bears the lug may be made of a single integral piece of metal.

As shown in Figs. 2 and 3, the lugs 6 and 9 are so formed and disposed with relation to each other that when the shears are closed the tapered end of the lug 9 will enter the notch or channel of the lug 6 and the abutment surfaces 10 will be brought into full contact with the abutment surfaces 7 to limit the closing of the shears. Since the lugs are integral with the shanks 2 and are of sturdy construction they hold the abutment surfaces 7 and 10 constantly in a definite correlation for accurate abutting co-action, and said surfaces are substantially non-yieldable along the line of movement of the lugs as the shears are closed. Preferably the angle of inclination of each abutment surface 7 and 10 exceeds the angle of repose or angle of friction of the abutting surfaces. By "angle of repose" or "angle of friction" is meant the angle low enough to cause wedging or resistance to separation of the abutting surfaces. A satisfactory inclination of each abutment surface with reference to its line or plane of movement is forty-five degrees, as shown. The pair of converging surfaces 7 or the pair of converging surfaces 10 then include an angle of ninety degrees and wedging action between the surfaces 7 and 10 is positively prevented.

By reason of their inclination the abutment surfaces co-act to distribute the force of impact in a manner to materially reduce shock and noise. The inclination of said surfaces resolves the force of impact into components some of which are directed laterally transversely of the lugs. Said lateral components will force the prongs or portions of the lug 6 at opposite sides of the cleft 8 to yield laterally outward slightly and also force the prongs or portions of the lug 9 at opposite sides of the cleft 11 to yield laterally inward slightly. This lateral yield of both lugs cushions the impact. Since the inclination of the abutment surfaces is well beyond the angle of repose they will form effective positive stops and at the same time prevent wedging action. The stop lugs are therefore freely separable and will not resist opening of the shears. The clefts 8 and 11 also afford clearance at the bottom of the V-shaped notch and at the apex of the tapering lug 9 and prevent the apex from bottoming in the notch and possibly holding the surfaces 10 out of contact with the surfaces 7. In addition the clefts enable each lug to be contracted or expanded if required to adjust the surfaces 7 and 10 for accurate co-action.

In Fig. 4 the stop lugs 6 and 9 are formed just as they are shown in Figs. 2 and 3 and as they have been described, but the end of lug 9 is slightly offset downward with relation to the opposed lug 6. As a result, when the shears are closed, only one of the abutment surfaces 10 will at first contact one of the abutment surfaces 7, and the force of impact will be received by one of the laterally yieldable portions of the lug 6 and one of the laterally yieldable portions of the lug 9 and will also be transmitted through the lugs and tend to cant the blade and handle members and force the blades closer together. Thus the initial impact force is absorbed by the shears. Later, both abutment surfaces 10 bear against both abutment surfaces 7 and the final impact force is cushioned by both laterally yieldable portions of each lug, at opposite sides of the cleft in the lug. This stepping or graduation of the impact further reduces the shock and noise.

In the modification shown in Fig. 5 there is, for co-action with the stop lug 6, a stop lug 9ª similar to the stop lug 9 of Figs. 2 and 3 except that the cleft 11 is omitted.

In the modification shown in Fig. 6 there is, for co-action with the stop lug 9, a stop lug 6ª similar to the stop lug 6 of Figs. 2 and 3 except that the cleft 8 is omitted.

Fig. 7 shows a modification of the stop means wherein one of the handle shanks has an integral stop lug 6ᵇ formed with a single inclined abutment surface 7ª, and the other handle shank has a lug 9ᵇ with a single inclined abutment surface 10ª to abut the surface 7ª. The surface 7ª is borne by a prong portion 12 of the lug 6ᵇ which may be slightly yieldable laterally and is strong and resilient. Said lug also bears another integral prong portion 13 which is thinner and more readily yieldable laterally than the prong portion 12. A longitudinal cleft 14 in the lug 6ᵇ separates said prong portions, and the portion 13 has a flat inner surface along said cleft forming an abutment face 7ᵇ disposed along the line or plane of movement of the lugs. The abutment faces 7ª and 7ᵇ define a substantially V-shaped notch into which the opposed end of the stop 9ᵇ is adapted to enter for abutment of the face 10ª against the face 7ª. The lug 9ᵇ is so disposed that, upon initial impact, it will contact only the face 7ª and will lie in the position indicated by dotted lines in Fig. 7. Then, by side slip upon the surface 7ª, a side abutment face 10ᵇ on the lug 9ᵇ will strike the side abutment face of the prong portion 13 of the lug 6ᵇ and said prong portion will yield laterally to cushion the impact.

In the operation of large two-handed shears considerable force is required for hedge cutting and similar work and the closing impact of the blunt stops usually employed in shears is consequently very noisy. The shock of impact is also painful and fatiguing to the hands and arms of the operator. My invention greatly reduces the noise and shock and it accomplishes this result by extremely simple and durable means.

While I have disclosed several very satisfactory forms of my improved stop means it is obvious that said means are susceptible of further modification without departing from the invention as expressed in the appended claims.

What I claim is:

1. In shears having pivotally connected blade and handle members, stop means to limit closing of the shears comprising opposed mutually engageable abutment surfaces borne by said members and located thereon between the pivot and the grip portions of the handles to move toward and from each other in the closing and opening of the shears and constantly held on said members in a definite correlation for abutting cooperation and being substantially non-yieldable on said members along their line of movement in the closing of the shears, one of said surfaces being inclined transversely of the line of movement of said surfaces to reduce the shock and noise of their impact upon closing of the shears and the angle of said inclination exceeding the angle of repose of the abutting surfaces to permit free separation of said surfaces.

2. In shears having pivotally connected blade and handle members, stop means to limit closing of the shears comprising opposed mutually engageable abutments borne by said members and located thereon to move toward and from each other in the closing and opening of the shears and constantly held on said members in a definite correlation and being substantially non-yieldable on said members along their line of movement in the closing of the shears, one of said abutments having an inwardly tapering recess opening toward the other abutment and said other abutment comprising a projection to enter and abut to said recess for lateral distribution of the force of impact by the taper of the recess, the taper of the recess being sufficient to prevent wedging of said projection therein and permit free separation of the abutments, and one of the abutments having a cleft extending longitudinally of its direction of movement and being laterally yieldable and resilient at said cleft to cushion the impact of the abutments.

3. In shears having pivotally connected blade and handle members, stop means to limit closing of the shears comprising lateral stop projections borne by said members in endwise opposed relation and disposed to shift toward and from each other as the shears are closed and opened, one of said projections having a notch at its end opposed to the other projection and forming inwardly converging abutment surfaces and the opposed end of the other projection being formed to enter said notch and abut said surfaces, one of said projections having a cleft extending longitudinally of its direction of movement and the projection being laterally yieldable and resilient at said cleft to cushion the impact of the projections when the shears are closed, and said converging surfaces making an angle exceeding the angle of repose of the co-acting abutment surfaces on the stop projections to permit free separation of the stop projections.

4. In shears having pivotally connected blade and handle members, stop means to limit closing of the shears comprising a stop projection borne by one of said members and extending toward the other member, said other member having a recess opening toward said stop projection and with inwardly converging opposite abutment side walls to both receive against them the opposed end of the stop projection and laterally dissipate the shock of impact, said converging abutment surfaces making an angle exceeding the angle of repose of the co-acting stop projection and said abutment surfaces to permit free separation thereof in opening of the shears, and the stop projection being transversely offset slightly with relation to said recess for contact of the stop projection initially with one of said abutment surfaces of the recess, and finally with both of said abutment surfaces, for the purpose set forth.

5. In shears having pivotally connected blade and handle members, stop means to limit closing of the shears comprising stop projections borne by said members in opposed relation and disposed to shift toward and from each other as the shears are closed and opened, one of said members having a notch opposed to the other projection and forming inwardly converging abutment surfaces, and an opposed portion of said other projection being formed to enter said notch and abut said surfaces, the notched projection having a cleft extending inward from the bottom of the notch and the other projection having a cleft extending inward from said entering portion thereof and both projections being laterally yieldable and resilient at their said clefts to cushion the impact of the stop projections when the shears are closed, and said converging surfaces making an angle exceeding the angle of repose to permit free separation of the stop projections.

6. In shears having pivotally connected blade and handle members, stop means to limit closing of the shears comprising stop projections borne by said members in opposed relation and disposed to shift toward and from each other as the shears are closed and opened, one of said members having a notch opposed to the other projection and forming inwardly converging abutment surfaces, and an opposed portion of said other projection being formed to enter said notch and abut said surfaces and having a cleft extending inward from its entering extremity and being laterally yieldable and resilient at said cleft to cushion the impact of the stop projection when the shears are closed, and said converging surfaces making an angle exceeding the angle of repose to permit free separation of the stop projections.

7. In shears having pivotally connected blade and handle members, stop means to limit closing of the shears comprising lateral stop projections borne by said members in endwise opposed relation and disposed to shift toward and from each other as the shears are closed and opened, one of said projections having a notch at its end opposed to the other projection and forming inwardly converging abutment surfaces, and the opposed end of said other projection being formed to enter said notch and abut said surfaces, the notched projection having a cleft extending inward from the bottom of the notch and the projection being laterally yieldable and resilient at opposite sides of said cleft to cushion the impact with said other projection when the shears are closed, and said converging surfaces making an angle exceeding the angle of repose to permit free separation of the stop projections.

8. In shears, stop means according to claim 7, characterized in that one of the stop projections is offset slightly transversely with relation to the other projection for impact initially upon one abutment surface of the notch and finally upon both abutment surfaces of the notch.

9. In shears having pivotally connected blade and handle members, stop means to limit closing of the shears located between the pivot and the grip portions of the handles and comprising a stop projection borne by one of said members and extending toward the other member, said other member having a recess opening toward said stop projection and with inwardly converging opposite abutment side walls to both receive against them the opposed stop projection and laterally dissipate shock of closing impact, said converging abutment surfaces making an angle exceeding the angle of repose of the co-acting stop projection and said abutment walls to permit free separation in opening of the shears, and the stop projection and said abutment walls being constantly held on said members in a definite correlation for abutting cooperation and being substantially non-yieldable on said members along their line of movement in the closing of the shears.

10. In shears, stop means according to claim 9, characterized in that a portion of the stop means subject to impact is yieldable and resilient laterally of the line of movement of the stop means in the closing of the shears, to cushion the impact.

FREDERICK M. WHYTE.